United States Patent [19]
Hodge et al.

[11] Patent Number: 5,594,491
[45] Date of Patent: Jan. 14, 1997

[54] NEAR-VIDEO-ON-DEMAND DIGITAL VIDEO DISTRIBUTION SYSTEM UTILIZING ASYMMETRIC DIGITAL SUBSCRIBER LINES

[75] Inventors: Winston W. Hodge, Yorba Linda; Lawrence E. Taylor, Anaheim, both of Calif.

[73] Assignee: VXL/HCR Technology Corporation, Yorba Linda, Calif.

[21] Appl. No.: 581,672

[22] Filed: Dec. 29, 1995

[51] Int. Cl.$^6$ ........................................ H04N 7/16
[52] U.S. Cl. ........................................ 378/7; 455/4.1
[58] Field of Search .......................... 348/7, 6, 8, 10; 455/4.1

[56] References Cited

U.S. PATENT DOCUMENTS

| | | | |
|---|---|---|---|
| 5,247,347 | 9/1993 | Litteral et al. | 348/7 X |
| 5,410,343 | 4/1995 | Coddington et al. | 348/7 |
| 5,414,455 | 5/1995 | Hooper et al. | 348/7 |
| 5,477,263 | 2/1995 | O'Callaghan et al. | 348/7 |

OTHER PUBLICATIONS

Hodge, "True Video on Demand vs. Near Video on Demand" *Interactive Television*, McGraw Hill, Inc. (1995), pp. 103–120.

*Primary Examiner*—Victor R. Kostak
*Assistant Examiner*—Nathan J. Flynn
*Attorney, Agent, or Firm*—Thomas Schneck

[57] ABSTRACT

A system for distribution of near-video-on-demand (NVOD) program information featuring use of ADSL telephone links. In NVOD, video program material is divided into segments which are spooled from a server into threads which contain the program information, but at times offset from each other. Telco central offices or other nodes are linked to each other by a publicly accessible network, such as the Internet, with either the telco central offices or Internet nodes providing thread replication so that service requests from a plurality of users may be met. At the telco central offices or nodes the threads may be multiplexed together for transmission over wideband channels, such as T1, OC3 or the like, while incoming threads are demultiplexed and routed to subscribers on ADSL channels. Each ADSL channel has a wideband portion operating in one direction and a narrow band portion operating in the opposite direction. The wideband portion feeds video material to subscriber settop boxes, with the spooling rate from the video server selected to be slightly less than the wideband portion bandwidth. The narrowband portion transmits service requests and user data to the server. Each settop box has a buffer which stores the current segment of the video program and is replenished with the next segment just before the current segment is used, so that the video program runs continuously.

20 Claims, 6 Drawing Sheets

|  | 36 | 32 | 36 |  |  |  |  |  |  |  |
|---|---|---|---|---|---|---|---|---|---|---|
| DATA PACKET NUMBER | 1 | 2 | 3 | 4 | 5 | 6 | 7 | 8 |  | 50 |
| 0 | 0 | 3600 | 7200 | 10800 | 14400 | 18000 | 21600 | 25200 | ... | 179950 |
| 1 | 1 | 3601 | 7201 | 10801 | 14401 | 18001 | 21601 | 25201 | ... | 179951 |
| 2 | 2 | 3602 | 10802 | 18002 | 14402 | 18002 | 21602 | 25202 | ... | 179952 |
| 3 | 3 | 3603 | 10803 | 18003 | 14403 | 18003 | 21603 | 25203 | ... | 179953 |
| 4 | 4 | 3604 | 10804 | 18004 | 14404 | 18004 | 21604 | 25204 | ... | 179954 |
| 5 | 5 | 3605 | 10805 | 18005 | 14405 | 18005 | 21605 | 25205 | ... | 179955 |
| 6 | 6 | 3606 | 10806 | 18006 | 14406 | 18006 | 21606 | 25206 | ... | 179956 |
| 7 | 7 | 3607 | 10807 | 18007 | 14407 | 18007 | 21607 | 25207 | ... | 179957 |
| 8 | 8 | 3608 | 10808 | 18008 | 14408 | 18008 | 21608 | 25208 | ... | 179958 |
| 9 | 9 | 3609 | 10809 | 18009 | 14409 | 18009 | 21609 | 25209 | ... | 179959 |
| 10 | 10 | 3610 | 10810 | 18010 | 14410 | 18010 | 21610 | 25210 | ... | 179960 |
| 11 | 11 | 3611 | 10811 | 18011 | 14411 | 18011 | 21611 | 25211 | ... | 179961 |

⋮

| 3588 | 3588 | 7189 | 16788 | 14388 | 17988 | 21588 | 25188 | 25718 | ... | 179989 |
|---|---|---|---|---|---|---|---|---|---|---|
| 3589 | 3589 | 7190 | 16789 | 14389 | 17989 | 21589 | 25189 | 25719 | ... | 179990 |
| 3590 | 3590 | 7191 | 16790 | 14390 | 17990 | 21590 | 25190 | 25720 | ... | 179991 |
| 3591 | 3591 | 7192 | 16791 | 14391 | 17991 | 21591 | 25191 | 25721 | ... | 179992 |
| 3592 | 3592 | 7192 | 16792 | 14392 | 17992 | 21592 | 25192 | 25722 | ... | 179993 |
| 3593 | 3593 | 7193 | 16793 | 14393 | 17993 | 21593 | 25193 | 25723 | ... | 179994 |
| 3594 | 3594 | 7194 | 16794 | 14394 | 17994 | 21594 | 25194 | 25724 | ... | 179995 |
| 3595 | 3595 | 7195 | 16795 | 14395 | 17995 | 21595 | 25195 | 25725 | ... | 179996 |
| 3596 | 3596 | 7196 | 16796 | 14396 | 17996 | 21596 | 25196 | 25726 | ... | 179997 |
| 3597 | 3597 | 7197 | 16797 | 14397 | 17997 | 21597 | 25197 | 25727 | ... | 179998 |
| 3598 | 3598 | 7198 | 16798 | 14398 | 17998 | 21598 | 25198 | 25728 | ... | 179999 |
| 3599 | 3599 | 7199 | 16799 | 14399 | 17999 | 21599 | 25199 | 25729 | ... | 180000 |

FIG. 5

NEAR-VIDEO-ON-DEMAND DIGITAL VIDEO DISTRIBUTION SYSTEM UTILIZING ASYMMETRIC DIGITAL SUBSCRIBER LINES

TECHNICAL FIELD

The invention relates to a system for transmission and distribution of near-video-on-demand (NVOD) program material.

BACKGROUND ART

Video-on-demand (VOD) is a system of providing video program material immediately upon request to a subscriber. Frequently, VOD is used in hotel rooms to provide guests with pay per view movies. In a typical VOD system, a bank of video tape recorders has program material queued and ready for transmission to a requestor, who may be several miles away.

In U.S. Pat. No. 5,410,343, Coddington et al. disclose a VOD system which relies upon telephone lines for distribution. In particular, use of asymmetric digital subscriber line (ADSL) telephone channels is disclosed, together with use of the public switched telephone network for delivery of video program material. ADSL channels are bi-directional digital telephone links having a 1.54 Mbps bandwidth in one direction and a 9600 bps bandwidth in the opposite direction. ADSL can be transmitted on ordinary wire pairs and cable is not required.

The system described by Coddington et al. represents a significant leap in the distribution of video program material because the public switched telephone network is ubiquitous, whereas cable networks are not. While cable networks may include telephone channels, the opposite has not been true, and previously it was thought that only cable networks had sufficient bandwidth at the subscriber level for video program material, especially for VOD.

Two problems are encountered with video-on-demand. The first is that there is a large capital expense associated with generating each program channel, known as a video thread. This is because each channel is dedicated to a particular user from the video server to the destination settop box. The second is that a large demand for the same video program is difficult to service, because capital equipment for generating each program channel is limited.

What is needed is a distributed approach to video-on-demand which uses the public switched telephone network, yet is not reliant on dedicated resources for each subscriber channel and this is the object of the present invention.

SUMMARY OF INVENTION

The above object has been achieved with a video program distribution system which uses near-video-on-demand (NVOD) to generate a plurality of video threads, each thread being a channel between the server and the user, containing, at any given time, a short segment of the video program, perhaps one video frame. The program is divided into a plurality of segments of digital data, each staggered in time relative to other threads so that the maximum wait for any point in the video program is equal to the time duration of one segment. A video server has the segments interleaved in any way which reduces head travel, with the segments being spooled off the server at a rate fast enough so that all threads can be serviced with a segment before the first channel again needs servicing. By the time a buffer has exhausted a stored segment, it has been replenished with the next segment, so that the overall effect is a continuous presentation of the video program material. Servicing of the threads is synchronized with the display rate of subscriber equipment.

Each thread is output on a telephone channel whose capacity in one direction is at least 1.54 Mbps, enough to accommodate the 1.5 Mbps bandwidth required for the VHS quality video thread supplied by the NVOD system. Asymmetric Digital Subscriber Loop (ADSL) is one transmission protocol which meets this requirement. Other systems offering the same or greater bandwidths could also be employed. Depending on the distribution method chosen, the video threads may be multiplexed onto a single high speed line, or on multiple ADSL lines.

Threads which have not been assigned to subscribers are not placed on the communications network, thereby conserving network bandwidth for needed communications.

All threads carried on a plurality of telephone channels may be fed to a local telephone switch (17), which is a multiplexer where a plurality of telephone channels are formed into data frames for transmission to a Telco central office.

Additionally, service requests are sent by the server to the Telco central office, indicating which subscriber's lines need to be connected to which threads.

At the Telco central office, said service requests result in replication of video threads as needed to supply the demands of subscribers assigned to them by the video server. Said replication is performed by means of conferencing the group of subscribers which have been assigned by the server to each of the appropriate channels on which a video thread has been placed. Each subscriber group may consist of from one to many subscribers. Such connection is made only once, for each complete video program, and is maintained for the duration of the video program. Each video program may consist of a short video clip used to fill the delay between a subscriber request and the start time of the next available thread, or a much longer program, such as a movie or sporting event.

From the central office, threads are fed to a telephone network, i.e. either to the public switched telephone network or to the Internet. Although not managed by one telephone company, the Internet largely relies upon telephone channels to link computers. Each network channel must have a bandwidth at least equal or greater than an ADSL channel.

The video program is transmitted over the telephone network to a subscriber intermediate destination, such as a central office convenient for a subscriber. An ADSL splitter is used to split the wide bandwidth signal from the narrow bandwidth signal. The large bandwidth signal is the video program which is to be sent to a subscriber settop box and TV receiver. The narrow bandwidth signal is the upstream command signal used to order or modify the service request. Other signalling channels could be employed.

The present invention obviates the need for dedicated channels between server and subscriber for popular video program material. The present invention is a form of digital broadcasting of video program material.

BRIEF DESCRIPTION OF THE DRAWINGS

FIG. 5 is a table exemplifying the division of a video program into a plurality of data streams and data packets in accord with the present invention.

BEST MODE FOR CARRYING OUT THE INVENTION

Figure 1:
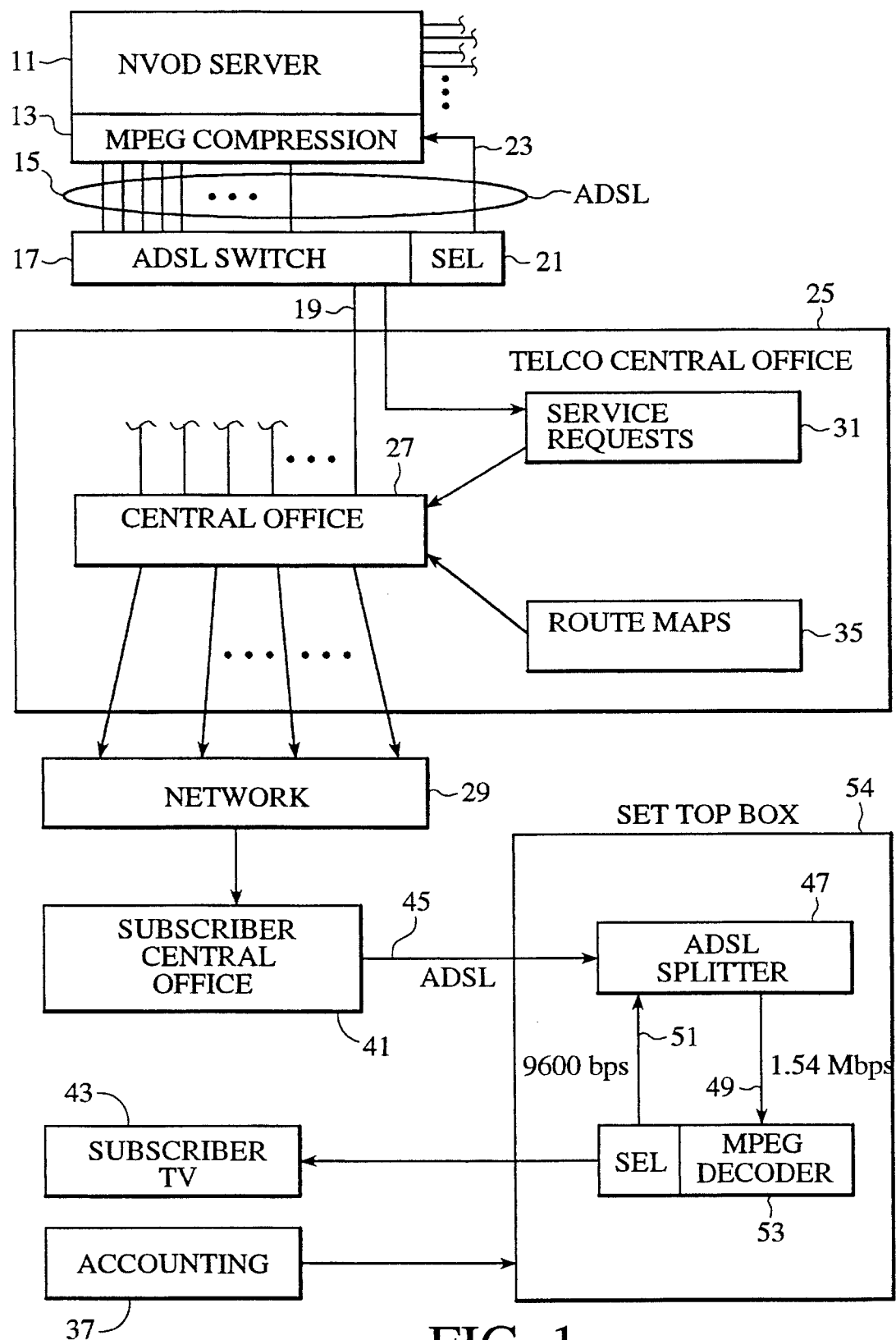
FIG. 1 is a plan view of an NVOD single subscriber electronic distribution system in accord with the present invention.

With reference to FIG. 1, a subscriber may request service from the video supplier through manipulation of appropriate controls on a set top box (54) attached to his TV (43) either directly or by means of a conventional remote control unit. The request for service is transmitted to the local subscriber Central Office (41) using ADSL protocol over standard twisted pair telephone wires, using the narrow band control channel.

The Telco Central Office (41) transmits the service request through the switched ADSL network (29) to the Telco central office (25). The Telco central office (25) forwards the service request over the reverse channel of the ADSL line (19) through the ADSL switch (17). The service request is split from the wide band channel by SEL (21) and received by the NVOD server (11) over virtual path (23).

The NVOD server (11) accesses an internal data base to ascertain that the service request is valid. It then pieces together a number of video clips of various lengths to fill the wait time before the scheduled start time of the next video thread. NVOD server 11 is a computer system with a disk drive having a capacity sufficient for video program material. For example, a one hundred minute motion picture film requires approximately 1 gigabyte of digital data storage capacity. Such a film might be divided into two minute segments so that there would be a total of fifty output threads, each thread staggered in time with respect to an adjacent thread by an interval of two minutes. The segments are arranged on the disk drive in a manner so that they can be identified and easily spooled off the disk. Each thread is sequentially fed with a two minute segment of video program data. By the time the last thread is supplied with its segment, the first segment is ready for re-supply with the next segment. As an example, the rate of supply from the video server 11 may be at 1.5 Mbps. With this bandwidth, the segments will be transmitted on ADSL telephone lines having a capacity of at least 1.54 Mbps plus the reverse direction channel, transmitting data at 9600 bps. To ensure that the data may be accommodated within the ADSL telephone channel, video compression process 13, such as MPEG, must be used. Such compression will reduce bandwidth requirements by about ten to twenty to one.

Each of the output threads 15 is transmitted to ADSL switch 17, which arranges the data in packets and then multiplexes the threads together for transmission over a single high capacity communications link 19. The link is preferably bi-directional to provide reverse direction communications from subscribers. Selector block 21 is a processor, which handles service requests. The requests are transmitted to the ADSL switch 17 on a separate control line which forwards them to the Telco central office. Communication along low capacity channel 23 would be required for changes in service, notification of errors and other messages which would command the server to take action other than continuous spooling of video program material segments.

Block 25 indicates a telephone central office to which the high capacity link 19 is connected. The central office features a main switch 27, which directs and routes telephone traffic into a connected network 29. The switch 27 includes replication logic wherein the same thread may be replicated a number of times in accord with service requests which are compiled in a service computer associated with block 31. Upon receipt of service requests, the service computer orders replication of a needed number of threads. Such replication is known as conferencing, whereby a single incoming channel is patched to a number of outgoing channels.

It will frequently happen that there will be an insufficient number of service requests for all threads to economically justify the existence of the thread. For those threads for which there is no request, the threads are not transmitted by the server. The removal of the non-requested channels allows for compaction of the signal going out of ADSL switch to the Telco central office and into network 29.

The central office also has electronic route maps 35 which are updated continuously. The switch 27 must route data packets in accord with specified addresses. However, routes must be tracked so that the video threads will not be sent into blocked or constricted paths. Again, the telco service computer can handle route mapping, by means of updating from national route information, available to all telephone companies.

Network 29 is a publicly accessible network, such as the public switched telephone network or the Internet having large bandwidth trunks, such as T1 service or OC3 service, extending between central offices. A subscriber central office 41 receives data packets from such trunks intended for subscriber 43. The data is broken down and placed on an ADSL line 45, similar to the ADSL line 15. An ADSL splitter 47 separates the video band 49 from the signalling band 51. The video band is at 1.54 Mbps, while the signalling band is at 9600 bps. The video band is directed into an MPEG decoder 53, in the subscriber's set top box 54 which expands the television signal for subscriber 43. The MPEG decoder has an associated small buffer unit that can store at least one entire segment for painting the screen of the associated television receiver until the next segment arrives.

Figure 2:
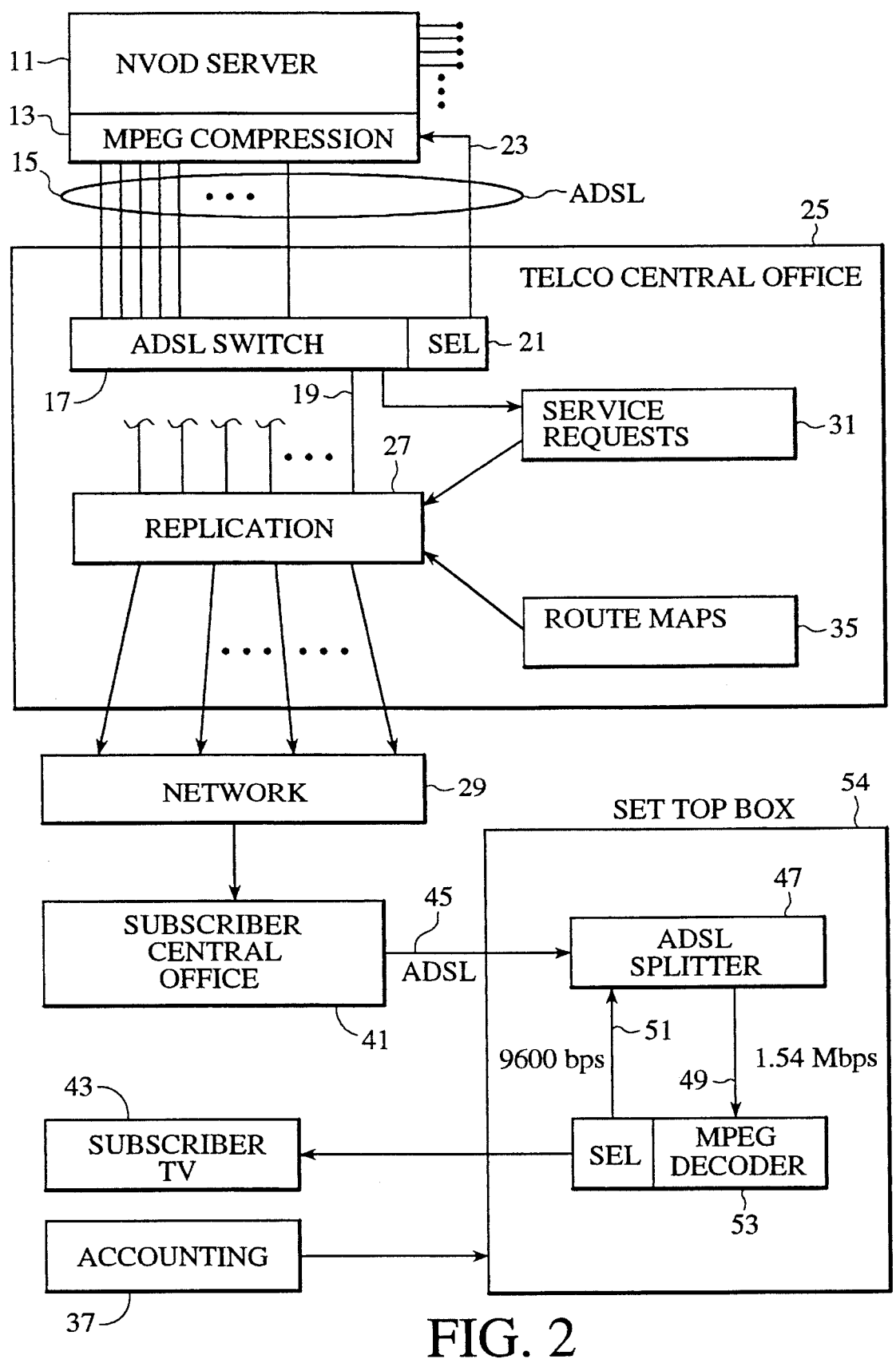
FIG. 2 is a plan view of an alternate embodiment of the system shown in FIG. 1.

FIG. 2 is similar to FIG. 1 except that the ADSL switch 17 and the associated selector 21 are within the telco central office, instead of being in the vicinity of server 11. In many instances, the ADSL switch 17 should be within a central office, because it is not convenient to locate the switch near the NVOD server 11. In other instances, especially where the server is considerably remote from the telco office, it may be more convenient to locate the ADSL switch near the server, as shown in FIG. 1.

Figure 3:
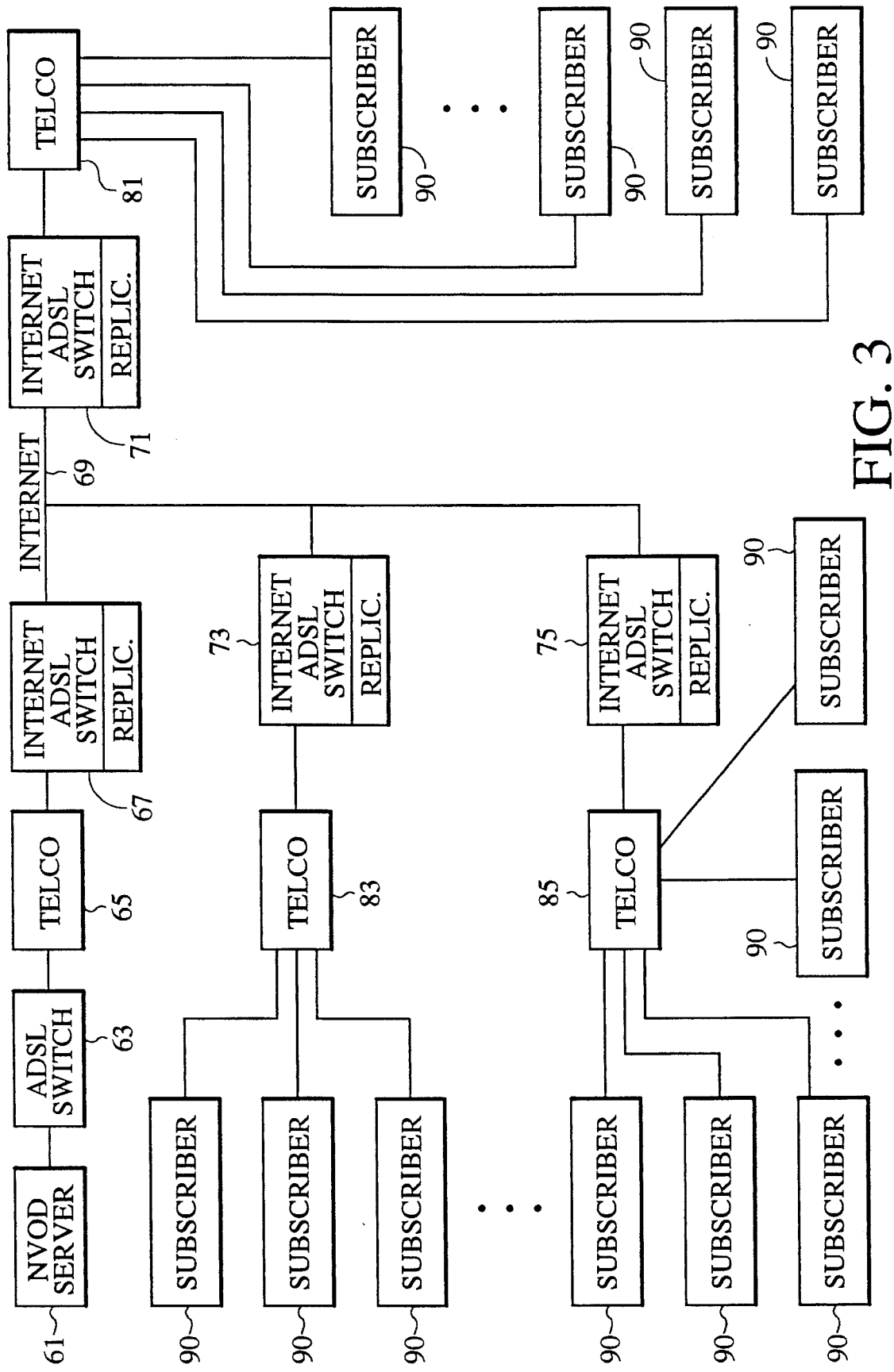
FIG. 3 is a plan view of an NVOD multiple subscriber distribution system in accord with the present invention.

In FIG. 3, NVOD server 61 is connected to ADSL switch 63, as in FIG. 1. The ADSL switch receives video segments from server 61 on ADSL lines and multiplexes them on a common telecommunications wideband channel to telco central office 65. At the central office, the same central office functions are carried out as explained with reference to FIG. 1, with the exception that the replication function is not necessarily associated with the telco, but associated with the network. Thus, the ADSL switch, with a replication function, indicated by block 67, is shown to be at the interface of a high bandwidth, high capacity network 69, such as the Internet. The backbone of the Internet consists of wide bandwidth channels which could be grouped together by the ADSL switch 67 to carry packets in T1 or OC3 channels. The switch 67 performs the same function as switch 27 in FIG. 1, providing the needed number of threads, based upon service requests. ADSL switches 71, 73 and 75 are similar to switch 67 and are distributed throughout the network for receiving packets originating from the NVOD server 61. Each switch transmits packets to a local telco 81, 83, and 85, respectively. At each telco, any multiplexed channels are de-multiplexed and individual ADSL channels are regenerated prior to transmission to subscribers 90. Each subscriber has a settop box, which handles service request functions. The settop box may accept credit cards or debit cards, using a card reader which uses the narrow bandwidth ADSL channel to report transactions to a billing server. The settop box also has a channel selector which uses the low capacity ADSL channel for signalling a desired video program and perhaps the desired delivery time.

Figure 4:
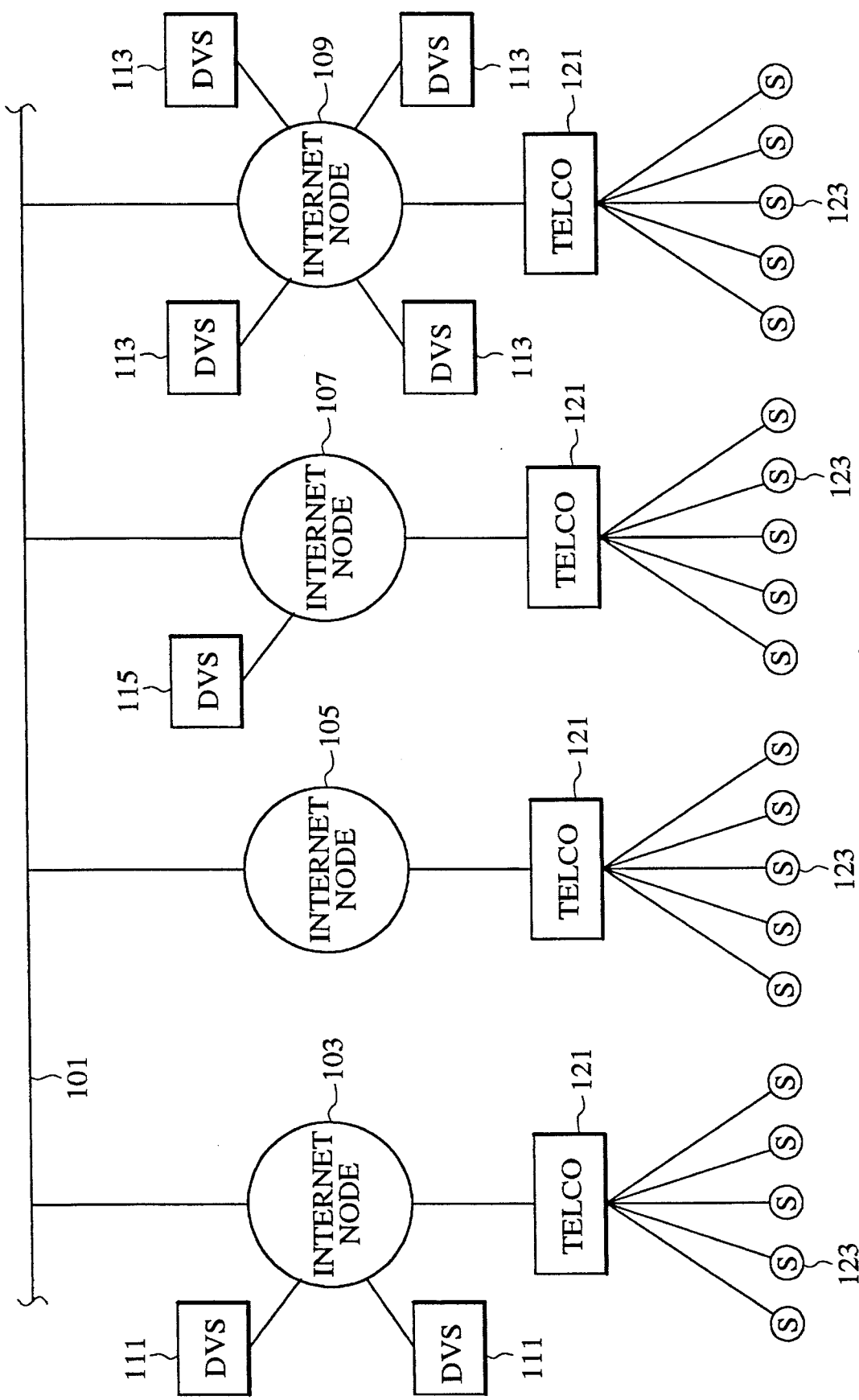
FIG. 4 is a plan view of an NVOD multiple video server and multiple subscriber electronic distribution system in accord with the present invention.

In FIG. 4, the backbone 101 of a network, such as the Internet, has a number of nodes 103, 105, 107 and 109. Each node has ADSL switching equipment for multiplexing and de-multiplexing ADSL channels. Each node also has routing and replication equipment. This allows the video servers 111 to be connected to node 103, while server 113 is connected to node 109, and server 115 is connected to node 107. These servers all generate near-video-on-demand segments which are staggered in time on output threads, which are compressed. Through these same nodes pass frames or packets to destination telco offices 121, where ADSL lines are individually regenerated from multiplexed channels. The individual ADSL lines feed subscribers 123 on the wideband ADSL channel and receive service request and control signals on the narrow band channel.

The interleave pattern of frames on a disk drive of the video server of FIG. 1 is configured to take advantage of the full bandwidth data transfer rate of the disk drive. This allows spooling video data from the disk drive so that digital data may be transmitted to multiple subscriber groups viewing different time offsets of the same movie concurrently, i.e., using different threads. Each thread must be fed with digital video packets of the program at a rate synchronized with the rate a TV screen must be fed with the program. The faster rate of spooling from the disk and of transmission relaxes the need to continually transmit video data to a subscriber and allows the threads to be fed sequentially. Therefore, all threads of the video programming material are concurrently transmitted to all subscribers in a time-multiplexed manner, as viewed from the subscriber's monitor, without the subscribers recognizing the interleaving of the sequence of frames that comprises the video programming material. The time displacing of threads to a subscriber increases the number of subscribers that may access a video program on any given disk drive, via thread sharing, such as by conferencing.

For example, MPEG2 requires a minimum transmission rate of 1.5 Mb/second in order to achieve a continuous presentation of a VHS quality video. A single disk drive which provides a data access rate of 10 MB/second enables spooling data from the disk drive and transmitting the data fifty-three times faster than is required for receiving MPEG2 encoded video frames; thus, fifty-three video frames of data could be transmitted in the time required to view one video frame of video data. This allows transmission of one frame of video data, each to fifty-three different groups of subscribers before a subsequent video frame would have to be transmitted to any given subscriber. This interleaving is transparent to all viewers of the video programming material. As discussed above, a key aspect in achieving this result is to avoid random cylinder seeks of the disk drive. The random cylinder seeks of the disk drive heads may be avoided by maximizing the amount of data that may be read sequentially therefrom. This requires dividing the video programming material into a plurality of segments for transmission to the subscribers so that each subscriber may obtain a continuous presentation of the programming material in real-time.

Referring to FIG. 5, a 100 minute video program, such as a movie, is shown as divided into a plurality of segments for viewing by a plurality of subscribers, as described above. A 100 minute movie consists of approximately 180,000 video frames totalling about 1 Gb of VHS quality data. The movie may be segmented into a plurality of data packets 34, each of which consists of a plurality of frames 32, with each of the frames corresponding to a different segment of viewing time in the movie, defining a time-slot 36. In this example, data packet 34 consists of a sequence of fifty video frames, with each pair of adjacent video frames 32 in the sequence separated by 3600 frames. The separation between adjacent frames 32 of a data packet 34 are each associated with and corresponds to two minutes of viewing time of the movie, thereby providing a two minute separation between adjacent time-slots 36. Thus, in each data packet 34 of this example, there are fifty time-slots 36, with one frame 32 associated with each time-slot 36.

Video frames 32 corresponding to identical time-slots 36 are arranged in chronological sequence in the manner in which the frames 32 would be viewed by a subscriber. As shown, frame 32, in data packet zero corresponding to time-slot one, includes frame number zero, with the frame 32, in data packet one, corresponding to time-slot one, including frame one. Similarly, frame 32, in data packet zero corresponding to time-slot two, includes frame number 3600, and frame 32, in data packet one corresponding to time-slot two, includes frame number 3601.

With the movie segmented in this fashion, each subscriber will receive a sequence of frames corresponding to a time-slot 36, thereby allowing a plurality of subscribers to concurrently view frames corresponding to the same movie.

Typically, a first subscriber requests to view a movie on the disk drive. The sequence of frames corresponding to time-slot zero would be transmitted to the first subscriber. If a second subscriber, slightly later, requested to view the movie on the same disk drive, the sequence of frames corresponding to time-slot one would be transmitted thereto. However, the second subscriber would be delayed or offset in time until subscriber one received the sequence of frames corresponding to data packet zero. For example, if subscriber two requested to view the movie when subscriber one was receiving data corresponding to frame 10804, subscriber two would be delayed or offset in receiving data transmission until subscriber one had received all the frames corresponding to time-slot three. The longest subscriber two would be delayed in receiving frames 32 corresponding to the 100 minute movie on the disk drive would be two minutes, i.e. the time to transmit data packets 34 containing frames 32 corresponding to a fifty time-slots 36. In this manner, 50 data threads could be concurrently transmitted to 50 different subscribers, with each of the threads containing all the frames of a movie. In this example, each frame of each thread would be displaced in time from a frame in an adjacent thread by two minutes. Data delivery must be coordinated or synchronized with the display rate at subscriber equipment so that the delivery of video data does not exceed the capacity of the local buffer. Thus, each subscriber is provided with near-video-on-demand.

Although the example provided above with respect to FIG. 5 discusses transferring 50 threads of data, the exact number of threads that may be transferred is dependent upon the data access rate, the data transfer rate required to provide a continuous presentation of the video programming material, and the length of the video program. As discussed above, to optimize the data transfer rate of a disk drive, not only must the video program be divided into a plurality of data segments, but the segments must be mapped onto a disk drive to minimize head seek-time. To that end, the mapping of the data is performed in accordance with an algorithm that arranges the frames of the video program in packets/clusters that maximizes sequential reading of the video data.

Figure 6:
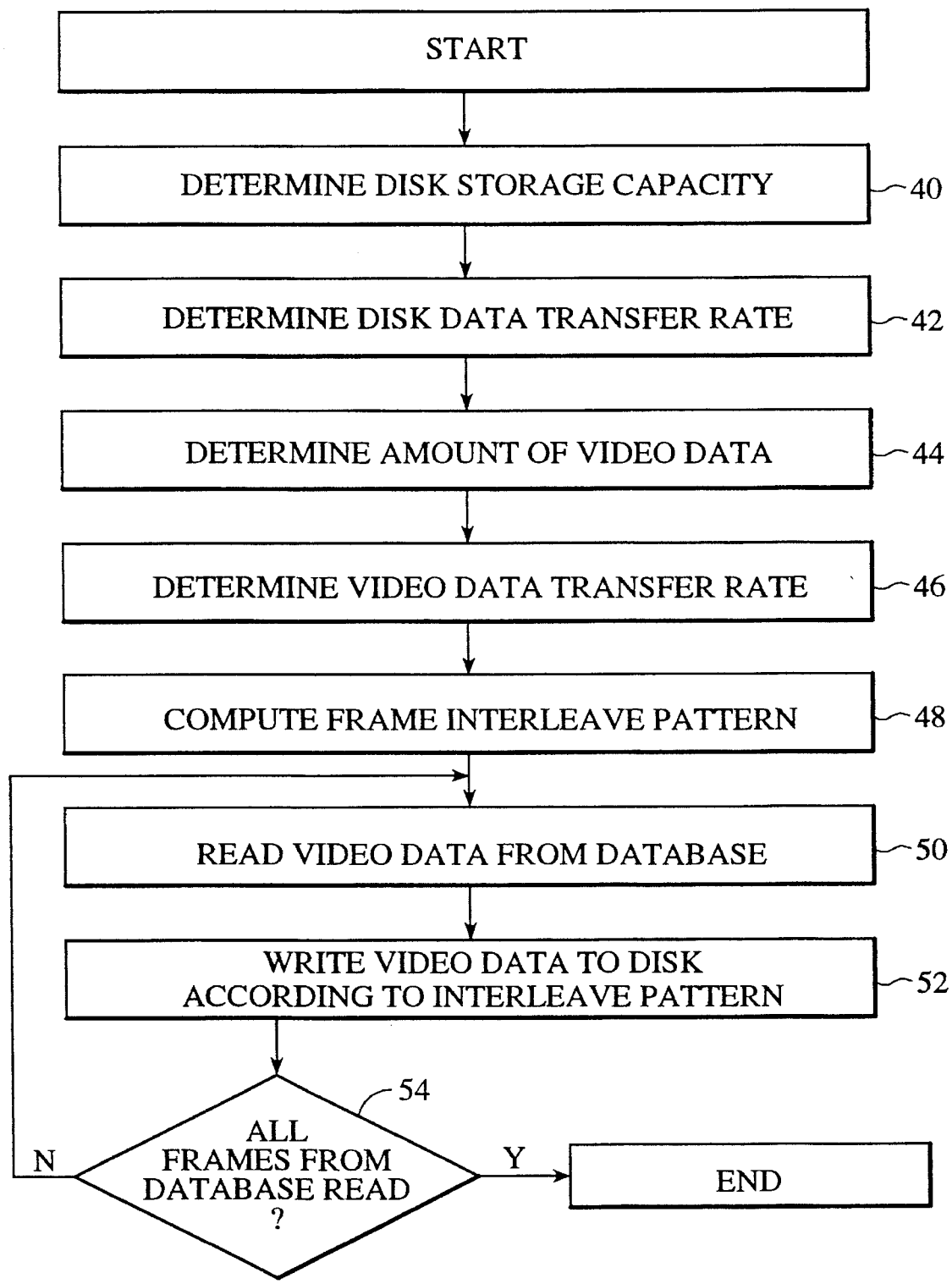
FIG. 6 is a flow chart of steps for distributing video data in accord with the present invention.

Referring also to FIG. 6, shown is a process employed to determine in what manner video programming material will be divided and how to map the material onto the disk drive to maximize access by subscribers. Typically, the process consists of a computer program/algorithm which is stored in memory 28 and operated on by microprocessor 26. At step 40, the algorithm first determines the disk storage capacity. At step 42, the disk data transfer rate is determined. Any process known in the art could be employed to determine the disk capacity and data transfer rate. Although the algorithm is shown as determining these parameters at two different steps, they may be determined simultaneously. One such process employs a controller to read disk size parameters from a resident memory segment on the disk drive. Alternatively, data could be written to disk drive until it reaches full capacity. Then, the data could be read therefrom to determine byte capacity. Concurrently, a software timer, or the like, could track the time required for reading the data from the disk drive and determine the data transfer rate.

At step 44, the quantity of video data to be recorded onto the disk drive is determined. At step 46, the video transfer rate of the movie data is determined. Both of these parameters are typically included in the header data of the video program material. These parameters may be read directly from the header material by the disk drive head or may be entered manually. At step 48, the spatial position of the data packets 34 are determined so that a plurality of threads may be produced, as described above. To determine the spatial position of the data packets, the algorithm first determines the number of threads of data that may be produced as follows:

$$N(T) = \frac{d}{v} \quad (1)$$

where "N(T)" is the number of threads that may be produced, "d" is the disk data transfer rate and "v" is the video transfer rate. It is preferred that the disk transfer rate be based upon the worse case disk transfer rate. The number of threads is equivalent to the number of frames that must be included in each video data packet 34. After determining the number of frames 32 in a data packet 34, the maximum number of data packets 34 on a disk drive is determined as follows:

$$N(p) = \frac{S}{T} \quad (2)$$

where "N(p)" is the number of data packets 34, "S" is the storage capacity of the disk drive, as determined as step 40, and "T" is the number of threads from equation 1.

After calculation of the number of data packets 34 and the number of video frames 32 within a data packet 34, the spatial positions of the data packets on the disk drive is determined. As described above, the spatial positions of the data packets 34 are selected to maximize sequential reading of data from the disk drive, which improves the data transfer rate of the same. At step 50, the video programming material to be recorded onto disk drive is read from vault 20, and at step 52, the video programming is recorded onto the disk drive. At step 54, the algorithm determines whether all data corresponding to the video programming material has been written to the disk drive.

With video programming mapped onto disk drive in accordance with the aforementioned algorithm, the video program will be sequentially read therefrom to create a distribution sequence. The distribution sequence will include a plurality of data packets 34. Demultiplexer 36 will transmit the frames 32 associated with each data packet 34 to the appropriate subscriber. In this fashion, each subscriber group will receive one thread containing all of the video frames associated with the video program.

We have found that ADSL circuits would be ideal for transmitting movies. To transmit the forty latest movies using video-on-demand technology to 100,000 ADSL subscribers across the United States would require 100,000 long line circuits. However, using the system of the present invention, the same forty movies could be transmitted to 100,000 subscribers with a two minute interleave period with only 2,000 long line circuits, assuming a 100 minute movie. Similarly, the same movies being shown to 1,000,000 video-on-demand subscribers would require 1,000,000 long line circuits, while the NVOD approach of the present invention would still require only 2,000 long line circuits. This is because of the sharing of resources at the telco and network levels.

We claim:

1. A system for electronic distribution of near-video-on-demand programs to subscribers comprising,
   a server having video program material in segments which are spooled from the server to a plurality of threads, the threads carrying the program with a time offset from one thread to another,
   a plurality of ADSL channels handling said threads between said server and a means for replicating selected threads,
   means for routing said threads to subscriber intermediate destinations,
   a publicly accessible network extending between said routing means and said subscriber intermediate destinations, and
   ADSL channels extending between said subscriber intermediate destinations and said subscribers.

2. The system of claim 1 wherein said network is the Internet.

3. The system of claim 1 wherein said network is the public switched telephone network.

4. The system of claim 1 wherein said means for routing said threads is a telco switch.

5. The system of claim 1 wherein a multiplexer is connected between said server and said network for combining said ADSL channels.

6. The system of claim 1 wherein each ADSL channel has a wideband portion and a narrowband portion, the wideband portion transmitting video segments to a subscriber and the narrowband portion transmitting service requests from the subscriber to the server.

7. The system of claim 1 wherein each subscriber has an associated settop box having means for requesting and paying for said video program.

8. The system of claim 7 wherein said means for payment comprises a card reader.

9. The system of claim 7 wherein said card reader is a credit card reader.

10. The system of claim 1 further including a means for reducing bandwidth requirements and a means for selectively preventing non-requested threads from being transmitted.

11. A system for electronic distribution of near-video-on-demand programs comprising, a near-video-on-demand server means for producing a plurality of video threads of the same program, staggered in time by a predetermined amount, each thread having segments of the program transmitted on an ADSL telephone channel, an ADSL switch means receiving the plurality of video threads from the near-video-on-demand server for multiplexing said threads to a telephone central office, a means in communication with said ADSL switch means for replicating threads from the ADSL switch means, a network means accessible to the public for transmitting threads received from the replicating means to subscriber central offices, a plurality of subscriber central offices connected to the network means for receiving transmitted video threads and transmitting the threads to subscribers on ADSL channels, subscriber settop boxes connected to respective subscriber central offices for receiving the transmitted threads, each settop box having an ADSL splitter connected to a television receiver and a program selector.

12. The system of claim 11 wherein said server includes a video compression means and each settop box includes a video compression decoder.

13. The system of claim 12 wherein the ADSL switch means includes selector logic for recognizing a program select command.

14. The system of claim 13 wherein the compression decoder includes selector logic for initiating a program select command.

15. The system of claim 12 wherein said compression means and said compression decoder are a store for compressed video and MPEG decoder respectively.

16. The system of claim 11 wherein said network means is the Internet.

17. The system of claim 11 wherein said network means is the public switched telephone network.

18. The system of claim 11 wherein the amount of time staggering for time adjacent video threads is less than thirty minutes.

19. The system of claim 11 wherein the number of threads per video program is more than three.

20. The system of claim 11 wherein the bandwidth of each telephone channel carrying said threads is at least 1.54 Mbps.

* * * * *